UNITED STATES PATENT OFFICE.

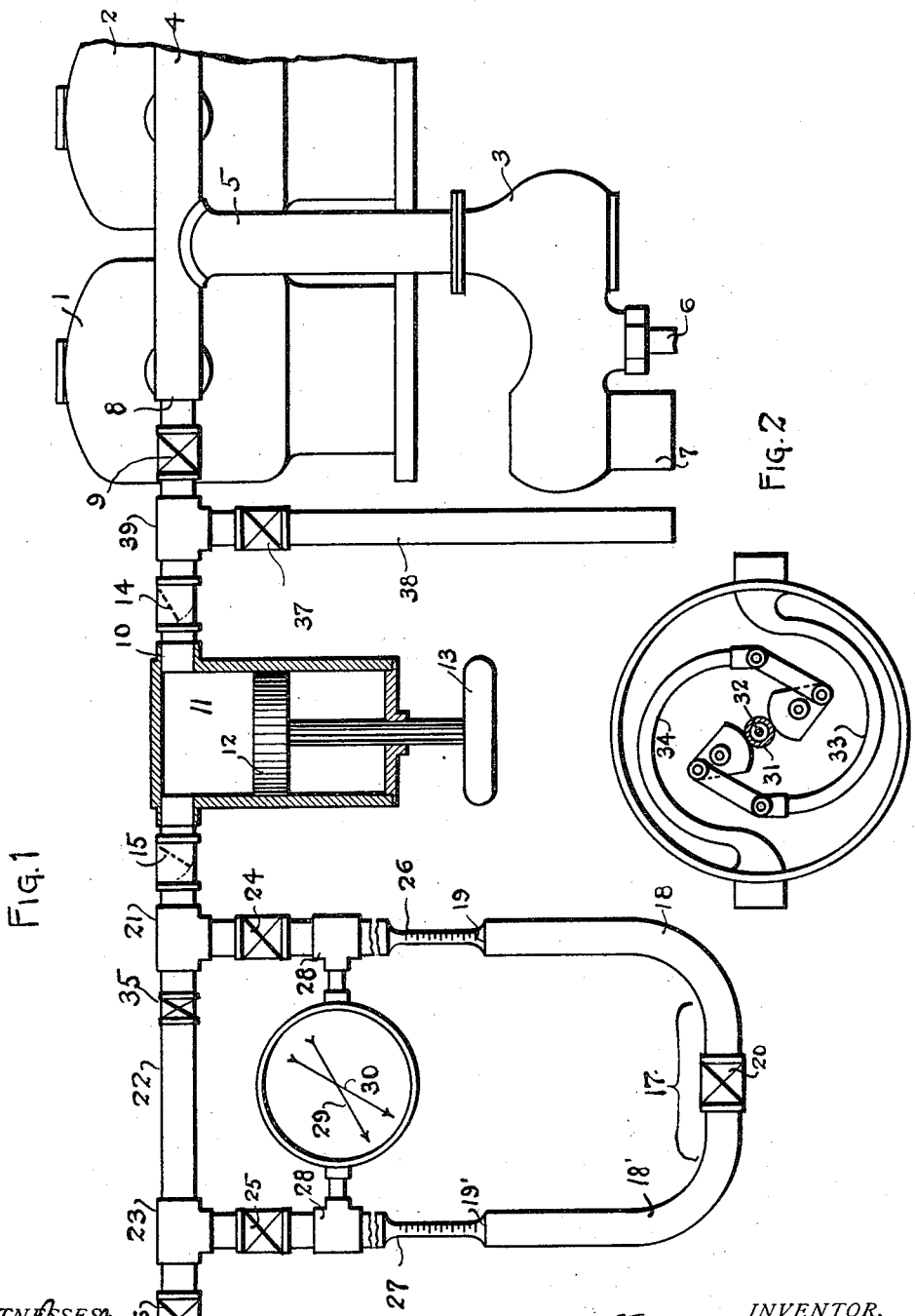

THOMAS M. EYNON, OF PHILADELPHIA, PENNSYLVANIA.

METHOD AND APPARATUS FOR TESTING GAS MIXTURES.

1,052,412.  Specification of Letters Patent.  Patented Feb. 4, 1913.

Application filed September 22, 1911. Serial No. 650,780.

*To all whom it may concern:*

Be it known that I, THOMAS M. EYNON, a citizen of the United States, and a resident of Philadelphia, Pennsylvania, have invented a certain new and useful Method and Apparatus for Testing Gas Mixtures, of which the following is a specification.

The purpose of my invention is to provide for a scientific determination of gaseous mixtures.

A further purpose of my invention is to compare the weight of equal volumes of a gaseous mixture and air or other suitable standard, preferably placing both under pressure in order that the differences may be more easily and more accurately measured.

A further purpose of my invention is to force a gaseous mixture into one side of a preferably U tube measure of gaseous weight or density and force a standard, as air, into the other side at equal pressure, comparing them to determine the proportions of the gaseous mixture either comparatively to a previous test or in actual percentage determined by previous calibration.

A further purpose of my invention is to superimpose the indicating means of gages subject to fluids under comparison.

Figure 1 represents, in elevation and partly in diagram, one form of my invention. Fig. 2 represents the gage of Fig. 1 in section parallel to the paper.

In the analysis and tracing of vapor engine troubles, particularly automobile troubles, as well as in the examination and testing of engines and automobiles when seemingly operating well, there is need of means for determining the actual or comparative performances of the carbureter and piping in mixing and distributing the gaseous fuel, of which gasolene is here assumed to be typical. The proportion of gasolene vapor and air used is highly important. No effective means of determining the proportion has been available and it has been judged chiefly from the performance of the engine, into which various other factors obviously enter.

I have invented a method and means by which the proportions of gasolene vapor and of air may be accurately determined or compared.

I have applied my invention to an automobile engine. It will be evident that it is equally applicable to all locations where knowledge of the proportions of a mixture of gases of different densities is desirable.

I have illustrated but a part of a well-known structure in connection with which my invention is useful, showing for example, two cylinders 1, 2, only, of propulsion mechanism which may involve many more cylinders. I have illustrated carbureter 3 as feeding the engines through a manifold comprising horizontal pipe 4 and vertical pipe 5, the gas being introduced to the cylinders through suitable intakes. The fuel gas is admitted at 6 and the air at 7. These are well-known and may vary greatly in their construction and physical arrangement.

At any desired point 8, in the manifold, by means of a valve shown diagrammatically at 9, I connect one side 10 of the pump 11, whose piston 12 is operated by suitable mechanism, here shown as handle 13. Check valves 14 and 15 are placed within the connections upon opposite sides of the pump to represent any simple form of pump valve construction. The connection at 8 is preferably permanent and not adjustable. Operation of the handle 13 is effective to draw gas from any part of the manifold to which the connection 8 is made, and to force it into a suitable gas density measure 17 of the construction hereinafter described. I recognize that any form of measure for the weight or density of gas, either by absolute or comparative methods, will be suitable for this purpose provided it be sufficiently delicate, not too much affected by vibration and properly calibrated, and that comparative methods do not require even actual calibration. I recognize also that it may not be necessary in all cases to place the gas under pressure or condense it, but prefer to do so for the reason that the weight of the column of gas will be much greater as compared with the column of air where both are under pressure, than if the pressure be not present, and that the consequent opportunity for error in measurement becomes less as the delicacy required of the instrument is reduced. I recognize also that slight variation in pressure of the gases compared will affect the seeming weight of the columns of gas compared and that accuracy of the readings of two pressure gage mechanisms or other suitable means of determining their equality of pressures or relative pressures, connected to the two sides of the measure, as well as accuracy in comparing them where two gages are used, is essential to the success of my method and apparatus when the pressure is raised upon one or, preferably, both the two gases compared. This would render it desirable to keep the pressure as low as the delicacy of the measuring apparatus used would permit.

In the mechanism which I illustrate, I have selected a U tube having both sides 18, 18' filled to the point 19, at which graduation begins, with a colored gas or a liquid heavier than the gases to be compared and capable of movement in the two sides of the U in proportion to the weight of the gas columns bearing upon the two surfaces. The valve 20 prevents movement of these gases during preparation for the test.

In supplying the gases to the two sides of the tube, I use connections which I have shown as including the common T 21, the section 22, T 23, valves 24, 25 and graduated tubes or scales 26, 27. Between the valves and the scales by any suitable connections, here shown as T's 28, I connect two gages having preferably co-axial needles 29, 30, the one operating a needle by means of a tube 31 surrounding the spindle 32 of the other. These gages may be in the form of Bourdon tubes 33 and 34, if desired. I prefer to make the needles co-axial because they can then be matched directly, one over the other, in reading, avoiding error in the reading as much as possible and giving opportunity for immediate observation in case of leakage on either side. They can also be compared at any position without reference to their common scale.

I show a valve 35 for use when desired to avoid passage of the gas being pumped through the valve 24 into the pipe 22, and provide free air exhaust valve 36 open for the purpose of freeing the gases upon both sides of the tube from pressure. Valve 37 and free air admission pipe 38 admit air when desired at T 39.

With the construction shown, when it is desired to pump mixed air and gas from the manifold into one side of the tube, as 18, the valves 9 and 24 are opened and valves 20, 36, 37 and 25 or 35, preferably the latter, are closed. Operation of the pump will place the desired pressure of gases upon the surface of the side 18, forming a column thereabove, predetermined by the length of the connections in the design of the instrument. The pressure upon this side is indicated, for example, by needle 29. The valves 9, 24 and 25, if it has not previously been closed, are now closed and valves 36, 37 and 35 are opened. The operation of the pump first expels all of the mixed gases previously pumped from the manifold through valve 36. The valve 36 is then closed and valve 25 opened. Operation of the pump now results in forcing air upon the surface of the side 18' of the U tube, and this is increased until the needle 30 exactly matches the needle 29 in position. Valve 25 is now closed. When the valve 20 is opened, the height of the fluid in the scale 27 indicates the excess of pressure due to excess of weight of the mixed gases from the manifold over that of the air. The various heights shown upon the scale 27 will indicate the densities of the mixture comparatively and the scale may be calibrated to indicate actual proportions in the gas mixture.

The accuracy of the gages may be checked by filling both sides above the fluid in the tube with air or gaseous mixture under the same pressures, as the heights of fluid in the two sides of the U column should then be equal.

Obviously, the pressure upon the side or compartment intended to represent the standard may be obtained in any suitable way, and may be maintained. Where this is intended a fixed marking may be used to represent the position which the needle would have to correspond with this pressure.

My invention contemplates the use of other gages, connections, etc., whereby, either by calibration or comparison, the density or weight of gases or vapors withdrawn from a manifold or mixing chamber or other feeder for an engine, may be determined.

Having thus described my invention, what I claim as new and desire to secure by Letters Patent is:—

1. In a device of the character stated, a vapor mixer, a comparative measure for the density of vapors and means for conveying the mixed vapor and a standard gas to the measure for determination of the density of the mixture.

2. In a device of the character stated, a chambered comparative measure for the density of the gases in the manifold of an explosion engine and of a standard gas and means for forcing mixed gases from the manifold to one compartment of the measure and the standard gas to another compartment for comparison.

3. In a device of the character stated, a U tube gas density measure, means for supplying mixed gases, and a pump and connections for forcing the mixed gases upon the surface of one side of the measure and air upon the surface of the other side of the measure for comparison.

4. In a device of the character stated, means for mixing and supplying gases, a comparative gas density measure having two compartments, pressure gages for the two compartments and having co-axial needles and means for forcing the mixed gases into one compartment and air into the other compartment.

5. In a device of the character stated, a comparative density measure having two compartments, means for forcing gases of different densities under pressure into the two compartments, a pressure gage for each compartment and co-axial superimposed registering mechanisms for the two gages.

6. In a device of the character stated, means for mixing and supplying gas, a comparative gas density measure having two compartments, a gage connected with one compartment, a gage connected with the other compartment and having its registering means superimposable upon the registering mechanism of the other gage and means for forcing the mixed gas and air respectively into the two compartments.

7. In a device of the character stated, means for mixing gases, a gas density measure and means for supplying the mixed gases to the measure.

8. In a device of the character stated, a gas mixing chamber, a gas density measure and means for supplying the mixed gases to the measure under pressure.

9. In a device of the character stated, a two-compartment gas density measure, means for supplying a standard gas under predetermined pressure within one compartment, a gas mixer and means for supplying the mixed gas to the other compartment.

10. The method of testing gas mixtures which consists in placing in the bottom of a U tube a fluid heavier than either gas to be compared, supplying the mixture to be tested and a standard gas in predetermined depths to different limbs of the tube at equal expansive pressures, and determining the difference in heights of the fluid in the limbs of the tube.

11. The method of testing gas mixtures which consists in placing in the bottom of a U tube a fluid heavier than either gas to be compared, supplying the mixture to be tested and a standard gas in predetermined depths to different limbs of the tube, compressing both the mixture and the standard to equal expansive pressures above atmospheric pressure, and determining the difference in heights of the fluid in the limbs of the tube.

THOMAS M. EYNON.

Witnesses:
F. E. SCHULTE,
J. CUSTER.

Copies of this patent may be obtained for five cents each, by addressing the "Commissioner of Patents, Washington, D. C."